US012811498B2

(12) United States Patent
McLean et al.

(10) Patent No.: US 12,811,498 B2
(45) Date of Patent: Nov. 24, 2026

(54) VOLTAGE CONVERTER FOR CONVERTING A DC INPUT VOLTAGE TO A DC OUTPUT VOLTAGE

(71) Applicant: Hamilton Sundstrand Corporation, Charlotte, NC (US)

(72) Inventors: Andrew McLean, Halesowen (GB); Stefanos Skoulaxinos, Huntington (GB)

(73) Assignee: HAMILTON SUNDSTRAND CORPORATION, Charoltte, NC (US)

( * ) Notice: Subject to any disclaimer, the term of this patent is extended or adjusted under 35 U.S.C. 154(b) by 148 days.

(21) Appl. No.: 18/825,637

(22) Filed: Sep. 5, 2024

(65) Prior Publication Data

US 2025/0158515 A1 May 15, 2025

(30) Foreign Application Priority Data

Nov. 15, 2023 (EP) .................................... 23386116

(51) Int. Cl.
*H02M 3/00* (2006.01)
*H02M 3/335* (2006.01)
*H02M 1/00* (2007.01)

(52) U.S. Cl.
CPC ......... *H02M 3/01* (2021.05); *H02M 3/33592* (2013.01); *H02M 1/0054* (2021.05); *H02M 3/33571* (2021.05)

(58) Field of Classification Search
CPC ...... H02M 7/519; H02M 7/521; H02M 7/523; H02M 7/75; H02M 7/757; H02M 7/7575; H02M 7/66; H02M 7/68; H02M 7/72; H02M 7/483; H02M 2007/4835; H02M 7/487; H02M 1/08; H02M 1/084; H02M 1/0845; H02M 7/515; H02M 7/525;
(Continued)

(56) References Cited

U.S. PATENT DOCUMENTS 8,411,468 B2 4/2013 Lalithambika et al.
8,908,401 B2 12/2014 Hiltbrunner et al.
(Continued)

FOREIGN PATENT DOCUMENTS

EP 4503421 A1 * 2/2025 ............. H02M 3/01

OTHER PUBLICATIONS

Bong-Chul Kim et al.: "The Novel Synchronous Rectifier Driving Method for LLC Series Resonant Converter", IECON 2012—38th Annual Conference on IEEE Industrial Electronics Society, IEEE, Oct. 25, 2012, pp. 810-813.
(Continued)

*Primary Examiner* — Crystal L Hammond
*Assistant Examiner* — Nusrat Quddus
(74) *Attorney, Agent, or Firm* — CANTOR COLBURN LLP

(57) ABSTRACT

A LLC voltage converter for converting a DC input voltage to a DC output voltage. The LLC voltage converter includes: a transformer having an input winding and an output winding, a controller and a current sensor. The current sensor measures a primary current through the input winding of the transformer and provides a measurement of the primary current to the controller. The controller determines when a secondary current, through the output winding of the transformer, is substantially zero based on the measurement of the primary current and a maximum value of the primary current.

20 Claims, 5 Drawing Sheets

(58) Field of Classification Search

CPC ...... H02M 7/527; H02M 7/529; H02M 7/539; H02M 3/07; H02M 3/073; H02M 7/10; H02M 7/103; H02M 7/106; H02M 1/088; H02M 2003/071; H02M 2003/072; H02M 2003/075; H02M 2003/076; H02M 2003/077; H02M 2003/078; H02M 2001/007; H02M 2001/0048; H02M 3/1582; H02M 3/1584; H02M 3/285; H02M 3/33561; H02M 7/49; H02M 1/045; H02M 7/006; H02M 7/06; H02M 7/068; H02M 7/153; H02M 7/19; H02M 7/08; H02M 7/17; H02M 7/493; H02M 7/53806; H02M 7/5381; H02M 7/217; H02M 7/538466; H02M 7/5387; H02M 7/53871; H02M 7/53873; H02M 7/53875; H02M 3/22; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 2003/1557; H02J 3/46; H02J 3/38; Y02B 70/1491; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H05B 39/048; B23K 11/24; H04B 2215/069

See application file for complete search history.

(56) References Cited

U.S. PATENT DOCUMENTS

| | | | | |
|---|---|---|---|---|
| 9,203,318 | B2 | 12/2015 | Scibilia | |
| 9,515,562 | B2 | 12/2016 | Dai et al. | |
| 9,837,907 | B1 | 12/2017 | Babazadeh et al. | |
| 11,652,368 | B2 | 5/2023 | Nakao et al. | |
| 2005/0207180 | A1 | 9/2005 | Pansier | |
| 2009/0097280 | A1* | 4/2009 | Wu | H02M 3/33592 363/17 |
| 2015/0124489 | A1* | 5/2015 | Dai | H02M 3/335 363/17 |
| 2019/0081547 | A1 | 3/2019 | Yu et al. | |
| 2023/0080559 | A1* | 3/2023 | Song | H02M 1/0009 363/21.02 |
| 2023/0131297 | A1* | 4/2023 | Escudero Rodriguez | H02M 3/33592 363/21.06 |
| 2024/0171080 | A1* | 5/2024 | Hirokawa | H02M 3/01 |

OTHER PUBLICATIONS

European Search Report for Application No. 23386116.0, mailed May 8, 2024, 11 pages.

Wei Yuqi et al. “Synchronous Rectification for LLC Resonant Converter: An Overview”, IEEE Transactions on Power Electronics, Institute of Electrical and Electronics Engineers, USA, vol. 36, No. 6, Jun. 2021, pp. 7264-7280.

* cited by examiner

VOLTAGE CONVERTER FOR CONVERTING A DC INPUT VOLTAGE TO A DC OUTPUT VOLTAGE

CROSS-REFERENCE TO RELATED APPLICATIONS

This application claims the benefit of European Patent Application No. 23386116.0 filed Nov. 15, 2023, the disclosure of which is incorporated herein by reference in its entirety.

TECHNICAL FIELD

This disclosure relates to LLC voltage converters for DC to DC voltage conversion, in particular LLC voltage converters for DC to DC voltage conversion using synchronous rectification.

BACKGROUND

FIG. 1 shows an LLC voltage converter 1000 for converting a DC input voltage Vin 1001 to a DC output voltage Vout 1002. The LLC voltage converter 1000 includes a voltage switching circuit element 1100, a resonant tank circuit element 1200, a transformer 1300 and an output circuit element 1400.

The voltage switching circuit element 1100 is arranged to receive the DC input voltage 1001 as an input and provide an alternating voltage at its output. The alternating voltage alternates between a low value and a high value at a switching frequency. In some applications, the switching frequency is varied, e.g. in use.

Various topologies may be used for the voltage switching circuit element 1200 including a full-bridge topology and a half-bridge topology. In the example shown in FIG. 1, the voltage switching circuit element 1100 has a half-bridge topology. This voltage switching circuit element 1100 includes a first (power) switching element Q1 1101 and a second (power) switching element Q2 1102. In this example, the first switching element Q1 1101 and the second switching element Q2 1102 may be operated to alternate the alternating voltage between zero and Vin 1001.

The first (power) switching element Q1 1101 and the second (power) switching element Q2 1102 may be referred to as power switching elements or power switches. These power switching elements may be simple switches or may be, for example, MOSFETs, BJTs or the like.

The resonant tank 1200 includes a magnetising inductance LM 1201 of an input winding of the transformer 1300 in series with a resonant capacitance CR 1202 and a resonant inductance LR 1203. The resonant inductance LR 1203 may include a leakage inductance of the transformer 1300. The resonant tank 1200 is arranged to receive the alternating voltage from the voltage switching circuit element 1100 as an input. The resonant capacitance CR 1202 and the resonant inductance LR 1203 resonate at approximately the switching frequency of the alternating voltage so as to apply a voltage across the magnetising inductance LM 1201 of the input winding of the transformer 1300.

The magnetising inductance LM 1201 of the input winding of the transformer 1300 is magnetically coupled to an output winding 1301 of the transformer 1300. Therefore, a voltage across the magnetising inductance LM 1201 of the input winding of the transformer 1300 induces a voltage across the output winding 1301 of the transformer 1300, as defined by the ratio of turns between the input winding and the output winding 1301.

An output circuit element 1400 is arranged to receive the voltage across the output winding 1301 of the transformer 1300. The output circuit element 1400 rectifies the voltage and filters out DC components so as to provide a DC output voltage Vout 1002. Various full-wave rectifier topologies may be used for the output circuit element 1400, including a push-pull rectifier topology with a centre-tapped output transformer winding and a full-bridge rectifier topology. In this example, the output circuit element 1400 has a push-pull rectifier topology with a centre-tapped output transformer winding 1301.

As can be seen in FIG. 1, in this example the output circuit element 1400 includes a third (rectifying) switching element Q3 1401 and a fourth (rectifying) switching element Q4 1402. The output circuit element also includes an output capacitor Cout 1403. In this example, the transformer 1300 is a tapped transformer, hence the output winding 1301 of the transformer 1300 has a tap 1302 between a first portion and a second portion of the output winding 1301. In this example, the first portion and the second portion are the same size, such that the tap 1302 is in the centre of the output winding 1301 of the transformer 1300.

In this example, the output capacitor Cout 1403 is connected to the tap 1302. The output capacitor Cout 1403 is also connected in series with the third (rectifying) switching element Q3 1401 and one end of the output winding 1301, as well as being connected in series with the fourth (rectifying) switching element Q4 1402 and the other end of the output winding 1301. The DC output voltage Vout 1002 is provided in parallel with the output capacitor Cout 1403. The output capacitor Cout 1403 filters out AC voltage components.

With this arrangement, rectification of the voltage across the output winding 1301 of the transformer 1300 may be achieved by synchronously turning on either the third (rectifying) switching element Q3 1401 or the fourth (rectifying) switching element Q4 1402, depending on the polarity of the voltage across the output winding 1301. In this manner, the voltage may be rectified by only allowing an output current Iout 1003 to flow in one direction whilst minimising the rectifier static losses.

The third switching element Q3 1401 and the fourth switching element Q4 1402 may be referred to as rectifying switching elements or rectifying switches. These rectifying switching elements may be simple switches or may be, for example, MOSFETs, BJTs or the like.

Using synchronous rectification, i.e. active rectification, may improve efficiency when compared with passive rectification. However, it may be important to turn off the rectifying switching elements, e.g. the third switching element Q3 1401 and the fourth switching element Q4 1402, when the current through the respective switching element is substantially zero to avoid switching losses.

Existing methods for controlling the turn off operation of the rectifying switching elements Q3 1401 and Q4 1402 include direct measurement of the output current Iout 1003, or other currents on the output side of the transformer 1300. However, as current measurement requires a resistive load, current measurement results in associated power losses. In step-down applications, the currents on the output side of the transformer 1300 are relatively high, and therefore so are the losses associated with measurement of these currents.

Existing methods also include measuring the voltage across the rectifying switching elements, e.g. the drain-source voltage in the case of MOSFETs. However, induced voltage drops caused by parasitic inductance, e.g. parasitic inductance of the rectifying switching elements, may result in a non-zero current through a rectifying switching element when the voltage across it is zero.

Various drawbacks of using a measured voltage across a rectifying switching element, e.g. the drain-source voltage Vds, to control operation of the switching element can be seen in FIG. 2.

FIG. 2 shows the gate-source voltage Vgs, used to control operation of a rectifying switching element, such as the third switching element Q3 1401, or the fourth switching element Q4 1402, of FIG. 1. When Vgs is high, the switching element is turned on so as to close the switching element and allow current to flow. When Vgs is low, the switching element is turned off so as to open the switching element. FIG. 2 also shows the (drain-source) current Ids through the switching element and the (drain-source) voltage Vds across the switching element.

When using a measurement of the (drain-source) voltage Vds to control turn off the switching element, control may be provided by turning off the switching element when the voltage across the switching element reaches a threshold voltage Vthresh slightly greater than zero. As shown in FIG. 2, the (drain-source) voltage Vds of the switching element may reach the threshold value Vthresh before the (drain-source) current Ids through the switching element reaches zero. As explained, this may occur due to parasitic inductance. Therefore, the switching element may turn off, at time t2, before the current Ids through the switching element is zero, at time t3. This results in switching losses, as zero current switching is not achieved.

FIG. 2 also shows that when using the (drain-source) voltage Vds to control turn on of the switching element, a delay is introduced between t0, when the (drain-source) current Ids is positive, and t1, when the rectifying switching element is turned on. This delay represents a blanking time, typically required to avoid mis-triggering the rectifying switching element by noise and/or non-monotonic current waveforms at low load. During this period, the command to turn on the rectifying switching element is suppressed and, in certain implementations, such as those that use MOSFETs, the current $I_{ds}$ flows through a body diode of the switching element in this period $t_0$ to $t_1$.

SUMMARY

The present disclosure provides a LLC voltage converter for converting a DC input voltage to a DC output voltage, the LLC voltage converter comprising: a transformer, comprising an input winding and an output winding; a controller; and a current sensor; wherein the current sensor is arranged to measure a primary current through the input winding of the transformer and provide a measurement of the primary current to the controller; and wherein the controller is arranged to determine when a secondary current, through the output winding of the transformer, is substantially zero based on the measurement of the primary current and a maximum value of the measurement of the primary current.

A substantially zero secondary current may be considered, for example, to be a current equal to or less than 20 A, 10 A, 5 A, 2.5 A, 2.0 A, 1.5 A, 1.0 A, 0.8 A, 0.5 A, 0.2 A, 0.1 A, 0.05 A or 0.01 A. A substantially zero current may depend on the application for which the LLC voltage converter is used, as each application may have, for example, different allowable switching losses or the like.

A substantially zero secondary current may be considered, for example, to be a current equal to or less than a certain percentage of the rated (e.g. maximum) secondary current. Thus, a substantially zero secondary current may be considered to be a current equal to or less than 10%, 5%, 2%, 1%, 0.5%, etc. of the rated secondary current. The percentage of the rated secondary current may depend on the application for which the LLC voltage converter is used, as each application may have, for example, different allowable switching losses or the like. By way of example, the rated secondary current may be, for instance, 200 A and so if the certain percentage is, for example, <10%, a substantially zero current may be considered to be a current of <20 A.

The input winding may be arranged so as to receive the DC input voltage, e.g. indirectly, and induce a voltage across the output, winding. For example, the input winding may be arranged on an input side of the LLC voltage converter and the output winding may be arranged on an output side of the LLC voltage converter.

The LLC voltage converter may comprise a resonant tank circuit element.

The resonant tank circuit element may comprise the input winding of the transformer and a capacitance in series with the input winding of the transformer.

The resonant tank circuit element may comprise an inductance in series with the input winding of the transformer and the capacitance. For example, this inductance may include a leakage inductance of the input winding of the transformer.

The LLC voltage converter may comprise a voltage switching circuit element. For example, the voltage switching circuit element may have topology such as a half-bridge topology, a full-bridge topology or the like.

The voltage switching circuit element may comprise an input, across which the DC input voltage is applied.

The voltage switching circuit element may be arranged to provide an alternating voltage, which alternates between a high value and a low value, across an output. For example, the voltage switching circuit element may be arranged to provide an alternating voltage across the resonant tank circuit element.

The alternating voltage may alternate between a high value and a low value at a switching frequency. For example, the alternating voltage may be a square-wave which alternates between a high value and a low value at a switching frequency. The switching frequency may be varied, e.g. in use.

In some examples, the voltage switching circuit comprises a half-bridge arranged to selectively connect and disconnect the DC input voltage to its output to provide an alternating voltage, which alternates between zero and the DC input voltage.

In some examples, the transformer is a step-down transformer. For example, the output winding may have fewer turns than the input winding.

In some examples, the output winding comprises a first portion, a second portion and a tap arranged between the first portion and the second portion. For example, the transformer may be a tapped transformer.

In some examples, the first portion is the same size as the second portion. For example, the transformer may be a centre tapped transformer.

In some examples, the LLC voltage converter comprises a first switching element operable as a synchronous rectifier to provide half-wave rectification of a secondary voltage across the output winding of the transformer. For example, the LLC voltage converter may include a synchronous rectifier arranged to rectify a secondary voltage across the output winding of the transformer, wherein the synchronous rectifier comprises a first switching element. For instance, the synchronous rectifier may have a push-pull rectifier topology, a full-bridge rectifier topology or the like.

In some examples, the LLC voltage converter comprises a second switching element operable as a synchronous rectifier to provide half-wave rectification of a secondary voltage across the output winding of the transformer. For example, the first switching element and the second switching element in combination (i.e. together) may be arranged to provide full-wave rectification of the secondary voltage. For example, the LLC voltage converter may include a synchronous rectifier arranged to rectify a secondary voltage across the output winding of the transformer, wherein the synchronous rectifier comprises a first switching element and a second switching element. For instance, the synchronous rectifier may have a full-wave rectifier topology or the like.

In some examples, the first switching element is connected to the first portion of the output winding and the output.

In some examples, the second switching element is connected to the second portion of the output winding and the output.

In some examples, the LLC voltage converter comprises an output capacitor arranged in parallel with the output.

In some examples, the controller is arranged to change the state of the first switching element when the controller determines the secondary current is substantially zero. For example, the controller may be arranged to change the state of the first switching element from closed to open or vice versa, e.g. depending on the current state of the first switching element, responsive to the controller determining that the secondary current is substantially zero.

In some examples, the controller is arranged to change the state of the second switching element when the controller determines the secondary current is substantially zero. For example, the controller may be arranged to change the state of the second switching element from closed to open or vice versa, e.g. depending on the current state of the first switching element, responsive to the controller determining that the secondary current is substantially zero.

In some examples, the controller is arranged to determine a magnetising current through the input winding of the transformer based on the measurement of the primary current.

In some examples, the controller is arranged to determine an adjusted magnetising current based on the magnetising current and the maximum value of the primary current.

In some examples, the controller is arranged to determine when the secondary current is substantially zero based on when the adjusted magnetising current is equal to the primary current.

In some examples, the controller is arranged to determine an adjusted magnetising current by adjusting the magnetising current proportionally to the maximum value of the primary current. The controller may, for example, add a value to the magnetising current that is proportional to the maximum value of the primary current and/or multiply the magnetising current by a value that is proportional to the maximum value of the primary current.

In some examples, the LLC voltage converter comprises a voltage sensor arranged to measure a primary voltage across the input winding of the transformer and provide a measurement of the primary voltage to the controller.

In some examples, the LLC voltage converter comprises a voltage sensor arranged to measure a secondary voltage across the output winding of the transformer and provide a measurement of the secondary voltage to the controller.

In some examples, the controller is arranged to determine a primary voltage across the input winding of the transformer. The controller may be arranged, for example, to use the measurement of the secondary voltage to determine the primary voltage. For instance, the controller may use the measured secondary voltage and a turns ratio between the input winding and the output winding in combination to determine the primary voltage.

In some examples, the controller is arranged to determine when the secondary current is substantially zero based on the (e.g. measurement of the) primary voltage. For example, the controller may determine the magnetising current based on the measurement of the primary voltage.

The disclosure also provides a controller for a LLC voltage converter for converting a DC input voltage to a DC output voltage, the LLC voltage converter comprising: a transformer comprising an input winding and an output winding; wherein the controller is arranged to receive a measurement of a primary current through the input winding; and wherein the controller is arranged to determine when a secondary current, through the output winding, is substantially zero based on the measurement of the primary current and a maximum value of the measurement of the primary current.

The controller may be suitable for the LLC voltage converter provided by the disclosure. Therefore, any of the optional features of the LLC voltage converter, e.g. any optional features of the controller of the LLC voltage converter, may apply equally to this controller.

The disclosure also provides a method of operating a LLC voltage converter for converting a DC input voltage to a DC output voltage, the LLC voltage converter comprising: a transformer comprising an input winding and an output winding; the method comprising: measuring the primary current through the input winding so as to determine a measurement of the primary current; and determining when a secondary current, through the output winding, is substantially zero based on the measurement of the primary current and a maximum value of the measurement primary current.

The method may be performed by any of the examples of the LLC voltage converter provided by the disclosure. As such, any optional features of the LLC voltage converter may equally be applied to the method of operating a LLC voltage converter and vice-versa.

In some examples, the LLC voltage converter comprises a resonant tank circuit element, the resonant tank circuit element comprising the input winding of the transformer.

In some examples, the method comprises providing an alternating voltage, which alternates between a high value and a low value, across the resonant tank circuit element.

In some examples, the method comprises selectively connecting and disconnecting the DC input voltage to the resonant tank circuit element.

In some examples, the method comprises stepping down the DC input voltage so as to provide a DC output voltage that is lower than the DC input voltage.

In some examples, the LLC voltage converter comprises a first switching element operable as a synchronous rectifier to provide half-wave rectification of a secondary voltage across the output winding of the transformer.

In some examples, the method comprises changing the state of the first switching element responsive to determining that the secondary current is substantially zero.

In some examples, the LLC voltage converter comprises a second switching element operable as a synchronous rectifier to provide half-wave rectification of a secondary voltage across the output winding of the transformer. For example, the first switching element and the second switching element in combination (i.e. together) may be arranged to provide full-wave rectification of the secondary voltage.

In some examples, the method comprises changing the state of the second switching element responsive to determining that the secondary current is substantially zero.

In some examples, the method comprises determining a magnetising current through the input winding of the transformer based on the measurement of the primary current.

In some examples, the method comprises determining an adjusted magnetising current based on the magnetising current and the maximum value of the primary current.

In some examples, the method comprises determining when the secondary current is substantially zero based on when the adjusted magnetising current is equal to the primary current.

In some examples, the method comprises determining an adjusted magnetising current by adjusting the magnetising current proportionally to the maximum value of the primary current.

In some examples, the method comprises measuring a primary voltage across the input winding of the transformer.

In some examples, the method comprises measuring a secondary voltage across the output winding of the transformer.

In some examples, the method comprises determining the primary voltage across the input winding of the transformer. This may be determined, for example, by using the secondary voltage across the output winding of the transformer and/or the turns ratio of the transformer.

In some examples, the method comprises determining when the secondary current is substantially zero based on the primary voltage.

BRIEF DESCRIPTION OF DRAWINGS

One or more non-limiting examples will now be described, by way of example only, and with reference to the accompanying figures in which.

DETAILED DESCRIPTION

Figure 1:
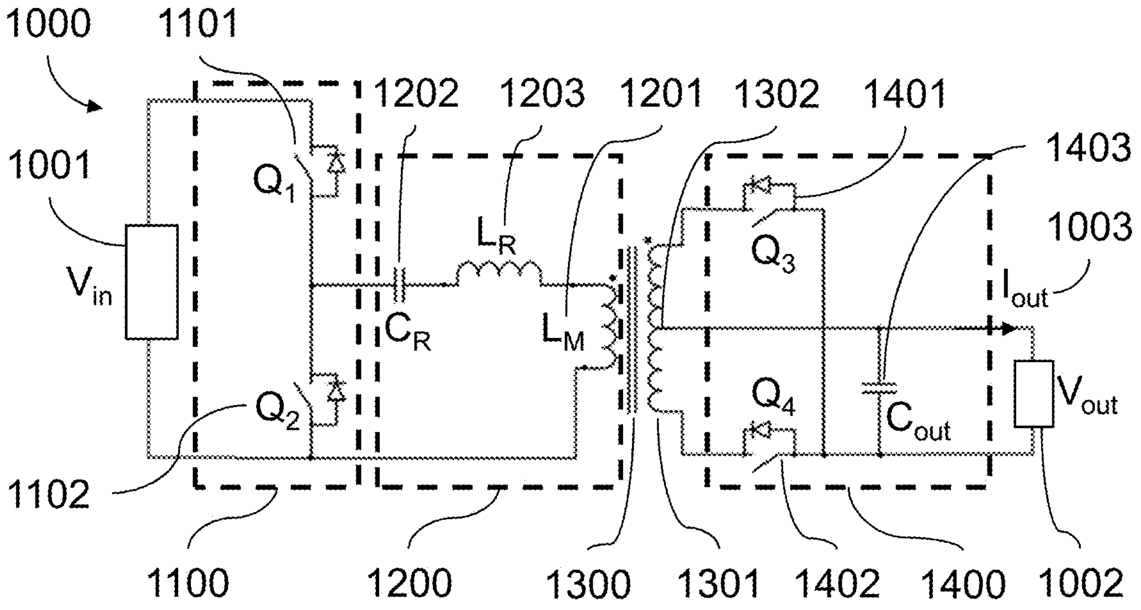
FIG. 1 shows an LLC voltage converter for converting a DC input voltage to a DC output voltage.
Figure 3:
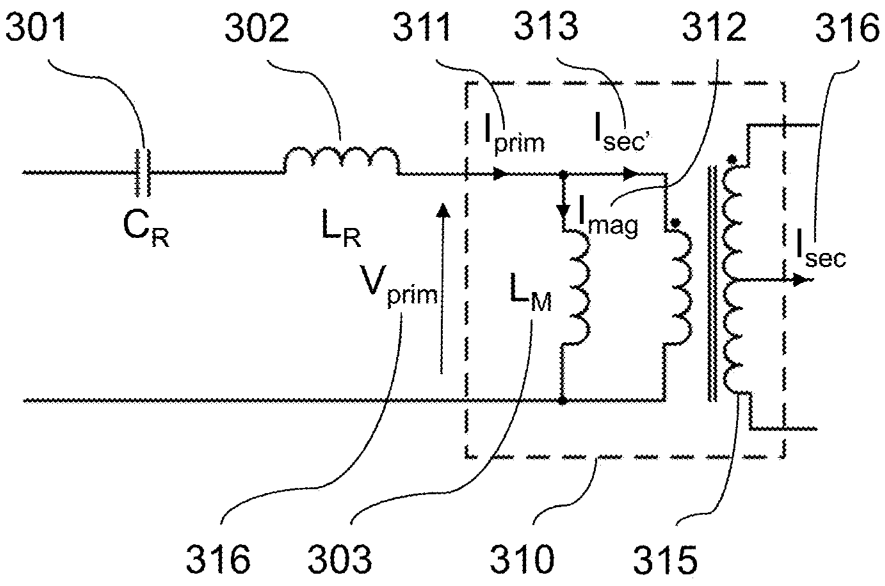
FIG. 3 shows a resonant tank of a LLC voltage converter, such as the LLC voltage converter shown in FIG. 1.

FIG. 3 shows a resonant tank of a LLC voltage converter, such as the resonant tank circuit element 1200 of the LLC voltage converter 1000 shown in FIG. 1. The resonant tank includes a magnetising inductance LM 303 of an input winding of a transformer 310 in series with a resonant capacitance CR 301 and a resonant inductance LR 302. The resonant inductance LR 302 may include a leakage inductance of the input winding of the transformer 310.

A primary current Iprim 311 flows through the input winding of the transformer 310. A primary voltage Vprim 316 is the voltage across the magnetising inductance LM 303 of the input winding of the transformer 310. An output winding 315 of the transformer 310 is also shown. A secondary current Isec 314 flows through the output winding 315 of the transformer 310.

The primary current Iprim 311 through the input winding of the transformer 310 may be modelled as the sum of a magnetising current Imag 312 and a reflected secondary current Isec' 313. The magnetising current Imag 312 induces the secondary current Isec 314 in the output winding 315 of the transformer 310, owing to the mutual inductance between the input winding of the transformer 310 and the output winding 315 of the transformer 310. The secondary current Isec 314 induces the reflected secondary current $I_{sec'}$ 313 in the input winding of the transformer 310, owing to the mutual inductance between the input winding of the transformer 310 and the output winding 315 of the transformer 310. Therefore, the secondary current $I_{sec}$ 314 may be determined by determining the reflected secondary current $I_{sec'}$ 313.

$$I_{mag} = \int_0^t \frac{V_{prim}}{L_M} dt \tag{1}$$

Equation 1 sets out the relationship between the magnetising current Imag 312, the magnetising inductance LM 303 and the primary voltage Vprim 316. Hence, for a known magnetising inductance LM 303, the magnetising current Imag 312 may be determined, for example, by measuring or otherwise determining the primary voltage Vprim 316.

The reflected secondary current Isec' 313 may be determined by subtracting the magnetising current Imag 312 from the primary current Iprim 311. It will be apparent that when the primary current Iprim 311 is equal to the magnetising current Imag 312, the reflected secondary current Isec' 313 is zero and therefore so is the secondary current Isec 316.

Determining when the secondary current Isec 316 is zero may be used to determine when to turn off rectifying switching elements used to rectify the voltage across the output winding 315 of the transformer 310, e.g. the third switching element Q3 1401 and the fourth switching element Q4 1402 shown in FIG. 1. This approach may help to eliminate the premature turning off of such rectifying switching elements, e.g. the time interval between t2 and t3 in FIG. 2.

Using the primary current to determine the secondary current, rather than direct measurement of the secondary current, may have several benefits. This may include reduction in power losses associated with measurement of relatively high secondary currents in step-down applications. This may also include a reduction in the number of components required, and thus a reduction in the weight of the LLC converter.

However, when using the primary current through the input winding to determine when to switch off the rectifying switching elements, it is possible that propagation delays may result in delayed turn off of the rectifying switching elements. These propagation delays may be introduced by factors such as ADC conversion time and the time required for the LLC voltage converter, e.g. a controller of the LLC voltage converter, to determine that the secondary current is zero.

Figure 4:
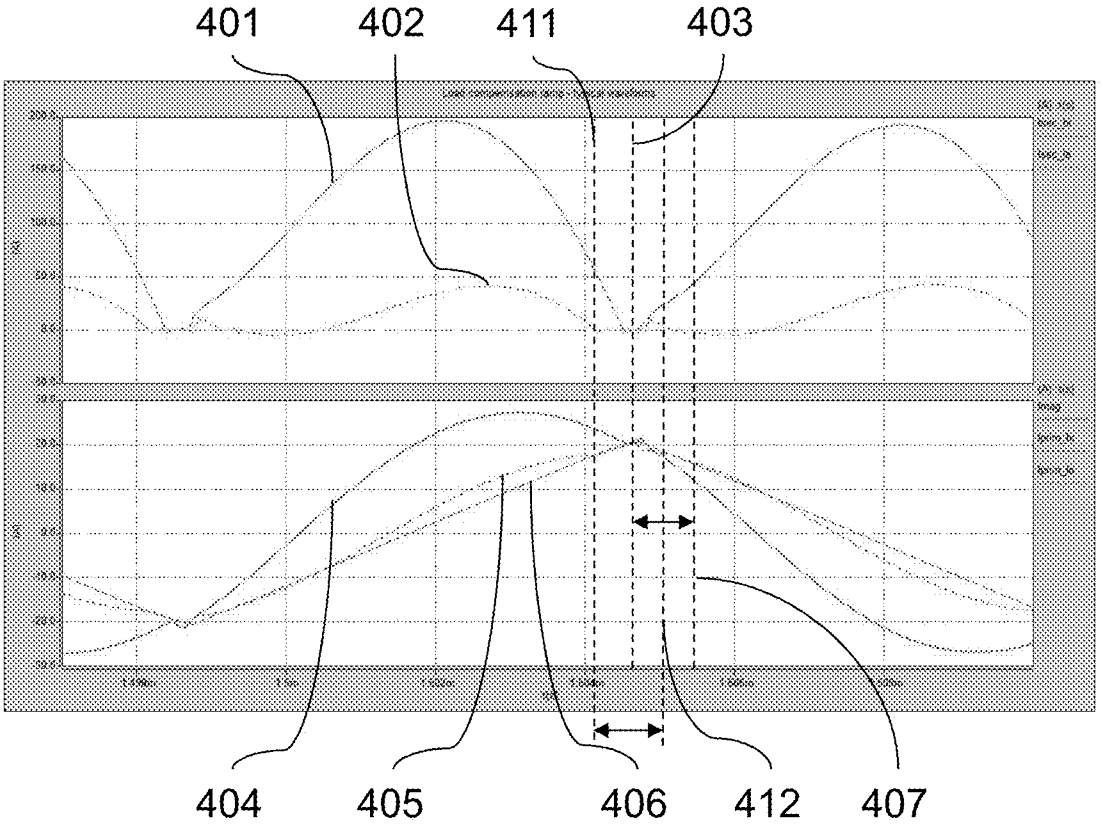
FIG. 4 shows a graph of various waveforms of the currents and voltages shown in FIG. 3 for a relatively high output load and a relatively low output load.

FIG. 4 shows a graph of various waveforms of the currents and voltages shown in FIG. 3 for a relatively high load on the output of the LLC voltage converter and a relatively low load on the output of the LLC voltage converter.

A first line 401 shows the secondary current Isec 316 when there is a relatively high load on the output of the LLC voltage converter. A second line 402 shows the secondary current Isec 316 when there is a relatively low load on the output of the LLC voltage converter. A first intersection line 403 indicates the instant when the secondary current is zero when there is relatively high load on the output of the LLC voltage converter. A second intersection line 411 indicates the instant when the secondary current is zero when there is relatively low load on the output of the LLC voltage convert.

A third line 404 shows the primary current Iprim 311 when there is a relatively high load on the output of the LLC voltage converter. A fourth line 405 shows the primary current Iprim 311 when there is a relatively low load on the output of the LLC voltage converter.

A fifth line 406 shows the magnetising current Imag 312 through the input winding of the transformer. The magnetising current Imag 312 in this example is the same for both the high loading condition and the low loading condition.

As will be apparent from the description of FIG. 3, when the magnetising current Imag 312 is equal to the primary current Iprim 311 the secondary current Isec 316 is zero. This can be seen in FIG. 4, as the first intersection line 403 crosses the intersection between the third line 404 (the primary current Iprim 311 under high loading conditions) and the fifth line 406 (the magnetising current Imag 312). Similarly, the second intersection line 411 crosses the intersection between the fourth line 405 (the primary current Iprim 311 under low loading conditions) and the fifth line 406 (the magnetising current Imag 312).

As previously explained, when using the primary current Iprim 311 through the input winding to determine when the secondary current Isec 316 is zero to switch off the rectifying switching element(s), it is possible that propagation delays may result in delayed turn off. As a result, the rectifying switching element(s) are not actually turned off until a time shortly after the secondary current is zero. A third intersection line 407 indicates the time at which the rectifying switching element is actually turned off under high loading conditions. Similarly, a fourth intersection line 412 indicates the time at which the rectifying switching element is actually turned off under low loading conditions. As can be seen in FIG. 4, the secondary current is not zero when the rectifying switching element is turned off, as a result of the delay, and therefore there are associated switching losses when turning off the rectifying switching element. Additionally, in examples where the rectifying switching element is a MOSFET, the body diode of the rectifying switching element will not typically behave as an ideal diode in practice and may allow some current to flow through the reverse direction if the timing of the rectifying switching element is not accurate.

Figure 5:
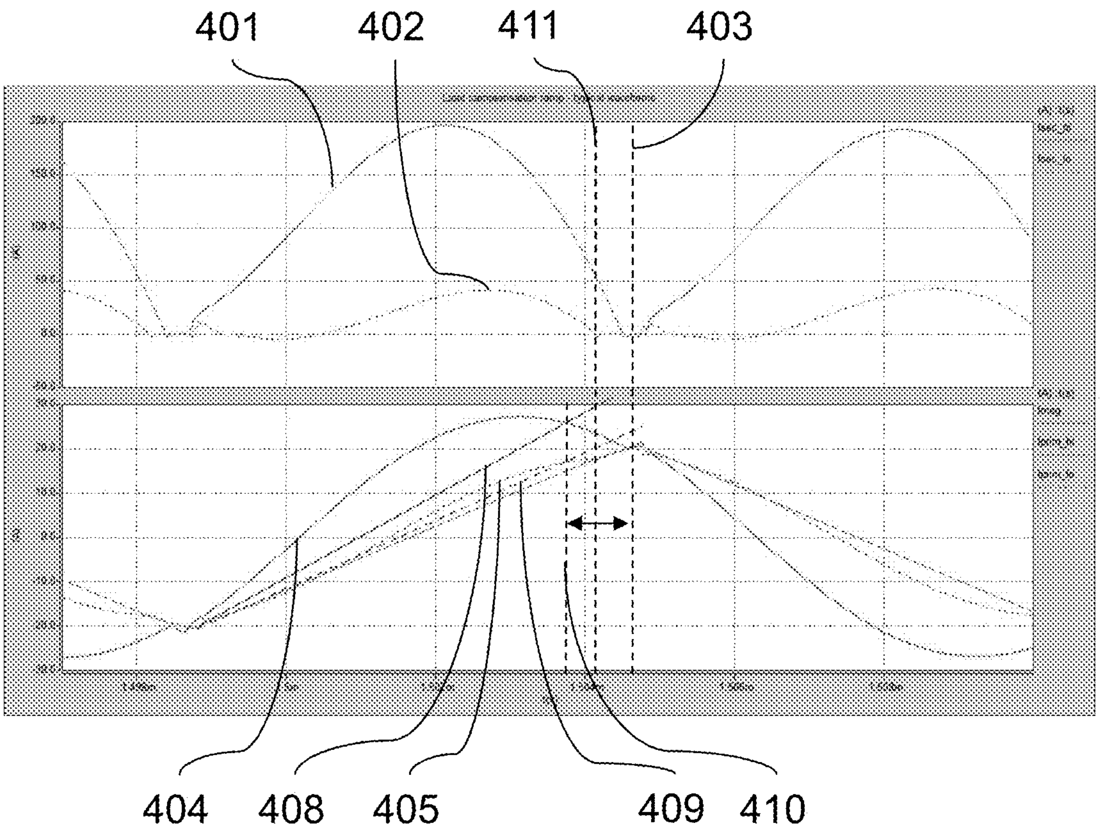
FIG. 5 shows a graph showing an adjusted magnetising current for a relatively high output load and a relatively low output load in addition to the waveforms shown in FIG. 4.

FIG. 5 is the same graph as shown in FIG. 4. However, FIG. 5 also shows a sixth line 408, corresponding to an adjusted magnetising current Imag_hi under high loading conditions, and a seventh line 409, corresponding to an adjusted magnetising current Imag_lo under low loading conditions. In this example, the magnetising current Imag 312 has been adjusted by adding a load current compensation ramp to the Imag 312. In other words, the magnetising current Imag 312 has been increased by a value that is proportional to the magnetising current Imag 312. A fifth intersection line 410 shows where the sixth line 408 (the adjusted magnetising current Imag_hi under high loading conditions) intersects the third line 404 (the primary current Iprim 311 under high loading conditions). In this example, this is the same point in time where the seventh line 409 (the adjusted magnetising current Imag_lo under low loading conditions) intersects the fourth line 405 (the primary current Iprim 311 under low loading conditions). However, in other examples the intersection between the adjusted magnetising current and the primary current Iprim 311 is different under different loading conditions.

As can be seen in FIG. 5, by adjusting the magnetising current Imag 312 differently under different loading conditions, the intersection point between the (adjusted) magnetising current and the primary current Iprim 311 can be shifted forward in time by a certain amount. This shift in time is able to compensate for the delay, e.g. propagation delay, shown in FIG. 4.

Therefore, if the rectifying switching element is turned off when it is determined that the adjusted magnetising current is equal to the primary current Iprim 311, the delay results in turn off of the switching element when the actual magnetising Imag 312 current is equal to the primary current Iprim 311. Thus, the secondary current Isec 316 is zero when the rectifying switching element is turned off. This results in zero current switching of the rectifying switching element, and an associated improvement in the efficiency of the LLC converter.

In this example, for instance, the rectifying switching element is turned off at the time indicated by the first intersection line 403, when the current the secondary current Isec 316 is substantially zero under both high loading conditions and low loading conditions. In other examples, as the intersection between the adjusted magnetising current and the primary current Iprim 311 may be different under different loading conditions, the rectifying switching element may be turned off at different times under different loading conditions.

It may be necessary to adjust the magnetising current Imag 312 differently under different loading conditions in order to introduce an appropriate advance, i.e. time shift, between when the adjusted magnetising current equals the primary current Iprim 311 and the point at which the secondary current Isec 316 is zero (e.g. so as to account for the delay shown in FIG. 4). The peak value Iprim_max of the primary current Iprim 311 is representative of the load on the output of the LLC voltage converter. Thus, in order to introduce a variable adjustment, depending on the loading conditions of the LLC voltage converter, an adjustment is made based on the peak value $I_{prim\_max}$ of the primary current Iprim 311.

$$I_{mag\_adjusted} = \frac{|I_{sec'\_ave}|}{I_{sec'\_max}} * \int_0^t \frac{I_{sec'\_max}}{k_{1c}} dt + \int_0^t \frac{V_{prim}}{L_M} dt \quad (2)$$

Adjusting the magnetising current Imag 312 proportionally to the peak primary current Iprim_max is set out in Equation 2. Equation 2 shows that determination of the adjusted magnetising current Imag 312 may be achieved by adding a value to the magnetising current Imag 312 which is proportional to the peak primary current Iprim_max and thus increases as the peak primary current increases. This is apparent from the relationship between the reflected secondary current Isec', the primary current Iprim 311 and the magnetising current Imag 312, as previously with reference to FIG. 3. The load compensation constant klc may be fine-tuned to adjust the gradient of the adjusted magnetising current (e.g. the seventh line 409 and/or the sixth line 408) to accurately compensate for the delay over a range of output loading conditions. The value added to the magnetising current Imag 312 to compensate for delays is normalized depending on the DC output current Iout of the LLC voltage converter relative to the rated DC output current Iout_max, which corresponds to the relationship between the average value of the reflected secondary current Isec'_ave relative to the maximum value of the reflected secondary current Isec'_max.

Figure 6:
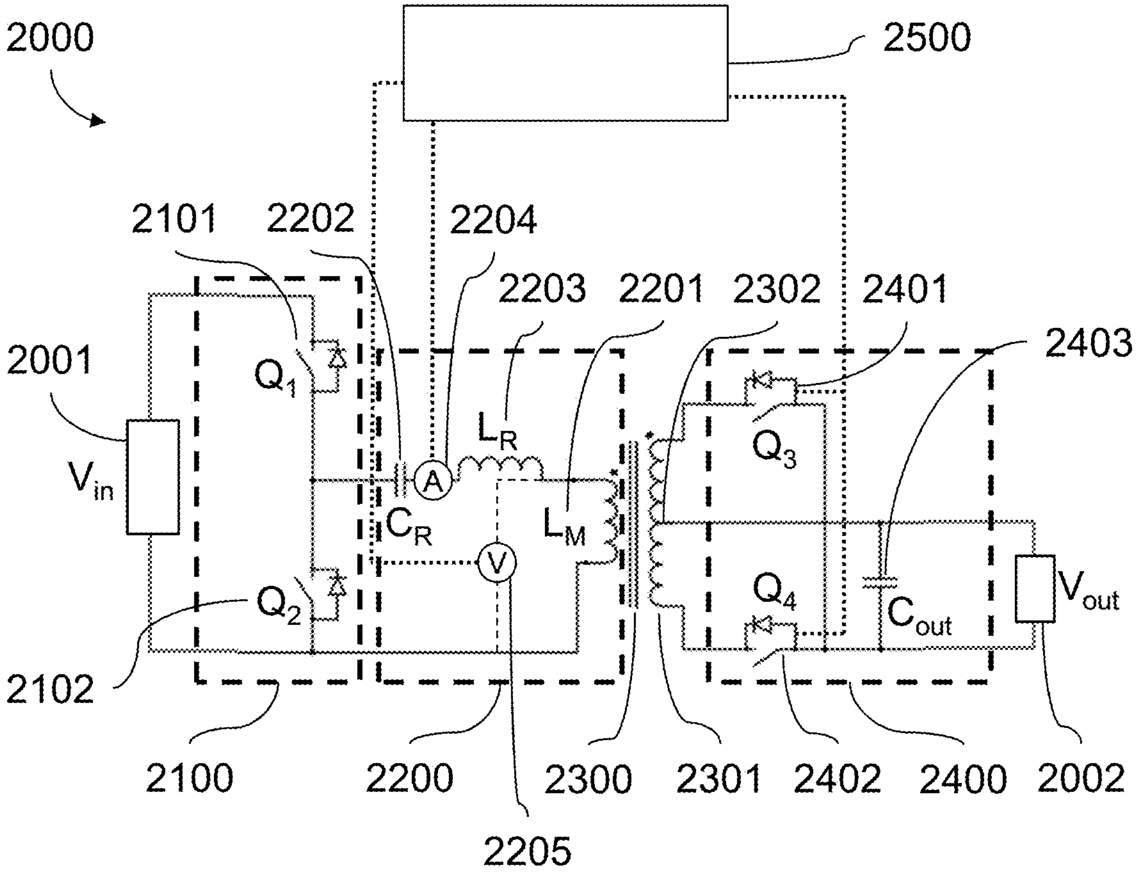
FIG. 6 shows another LLC voltage converter for converting a DC input voltage to a DC output voltage.

FIG. 6 shows a LLC voltage converter 2000 for converting a DC input voltage Vin 2001 to a DC output voltage Vout 2002. This may be similar to the LLC voltage converter 1000 shown in FIG. 1. As such, only the relevant differences between the voltage converter 2000 of FIG. 6 and the voltage converter 1000 of FIG. 1 will be discussed in detail.

Figure 2:
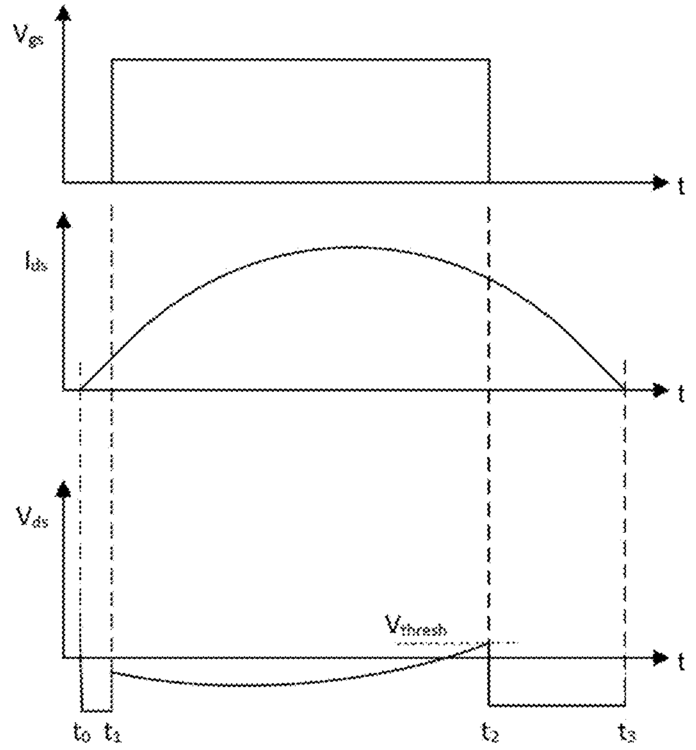
FIG. 2 shows waveforms of the gate-source voltage, drain-source current and drain-source voltage for rectifying switching elements, such as those shown in FIG. 1.

As per the LLC voltage converter 1000 of FIG. 1, the LLC voltage converter 2000 of FIG. 2 includes a voltage switching circuit element 2100, a resonant tank circuit element 2200, a transformer 2300 and an output circuit element 2400.

As per the LLC voltage converter 1000 of FIG. 1, the voltage switching circuit element 2100 in this example has a half-bridge topology including a first power switching element Q1 2101 and a second power switching element Q2 2102. However, in other examples the voltage switching circuit element 2100 could have, for example, a full-bridge topology.

As per the LLC voltage converter 1000 of FIG. 1, the resonant tank circuit element 2200 includes a resonant capacitance CR 2202, a resonant inductance LR 2203 and the magnetising inductance LM 2201 of an input winding of the transformer 2300. The LLC voltage converter also include a voltage sensor 2205 arranged to measure the voltage across the magnetising inductance LM 2201 of the input winding of the transformer 2300, e.g. Vprim 316 shown in FIG. 3, and a current sensor 2204 arranged to measure the current through the input winding of the transformer 2300, e.g. Iprim 311 shown in FIG. 3.

The output circuit element 2400 includes an output winding 2301 of the transformer 2300. The output circuit element 2400 could have, for example, a full-bridge rectifier topology. However, in this example the output circuit element 2400 has a push-pull rectifier topology. In this example, the output circuit element 2400 is similar to the output circuit element 1400 of the LLC voltage converter 1000 of FIG. 1. Thus, this output circuit element includes a third (rectifying) switching element Q3 2401, a fourth (rectifying) switching element Q4 2402 and an output capacitor Cout 2403.

The LLC voltage converter 2000 also includes a controller 2500. This controller is arranged to receive the measurement of the primary current Iprim from the current sensor 2204 and the measurement of the primary voltage Vprim from the voltage sensor 2205. In other examples, the primary voltage Vprim may not be measured, but may instead be determined indirectly, e.g. by calculation or the like. In certain examples, for instance, the voltage across the output winding 2301 of the transformer 2300 may be measured and the primary voltage Vprim determined using the turns ratio between the input winding of the transformer 2300 and the output winding 2301.

The controller 2500 is arranged to determine when to turn off the third (rectifying) switching element Q3 2401 and the fourth (rectifying) switching element Q4 2402 such that the secondary current through the output winding 2301 of the transformer 2300, e.g. Isec 316 shown in FIG. 3, is zero when the rectifying switching elements are turned off so as to achieve zero current switching. Further, the controller 2500 is arranged to control operation of the third (rectifying) switching element Q3 2401 and the fourth (rectifying) switching element Q4 2402 based on the determination of when the secondary current is zero.

Figure 7:
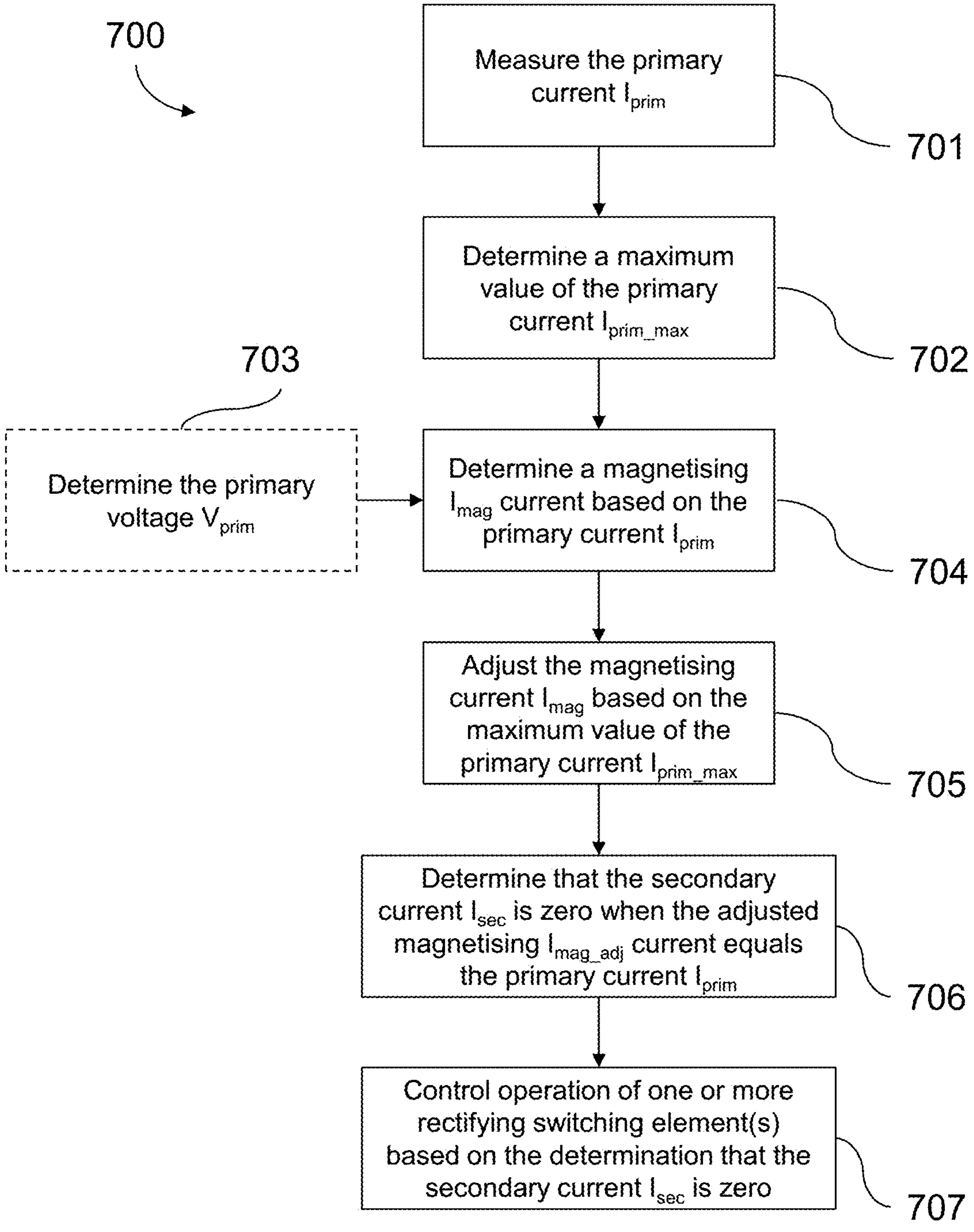
FIG. 7 shows a method of operating a LLC voltage converter, such as the LLC voltage converter shown in FIG. 6.

FIG. 7 shows a method 700 of operating of a LLC voltage converter, such as the LLC voltage converter 2000 shown in FIG. 6. This method 700 may be performed, for example, by the LLC voltage converter 2000 of FIG. 6, so as to ensure substantially zero current switching of the third (rectifying) switching element Q3 2401 and/or the fourth (rectifying) switching element Q4 2402.

The method 700 includes a first step 701 of measuring the primary current through an input winding of a transformer, e.g. Iprim 311 in FIG. 3.

The method 700 includes a second step 702 of determining a maximum value of the primary current.

The method 700 optionally includes a third step 703 of determining, e.g. by measuring, a primary voltage across the input winding, e.g. Vprim 316 in FIG. 3. While this, optional, step may include determination of the primary voltage by direct measurement, it is also possible that determination of the primary voltage could occur through calculation or the like. Hence, it is not necessary for the primary voltage to be measured in order for it to be determined.

The method includes a fourth step 704 of determining a magnetising current through the input winding based on the primary current, e.g. Imag 312 shown in FIG. 3. For example, the magnetising current may be determined using Equation 1, as previously described.

The method includes a fifth step 705 of adjusting the magnetising current based on the maximum value of the primary current. For example, the magnetising current may be adjusted using Equation 2, as previously described.

The method includes a sixth step 706 of determining that a secondary current through an output winding of the transformer, e.g. Isec 316 in FIG. 3, is zero when the adjusted magnetising current, determined in the fifth step 705, is equal to the primary current, measured in the first step 701.

The method also includes a seventh step 707 of controlling operation of one or more rectifying switching elements, e.g. the third (rectifying) switching element Q3 2401 and/or the fourth (rectifying) switching element Q4 2402 of FIG. 6, based on the determination that the secondary current is zero. For example, when it is determined that the secondary current is zero, a rectifying switching element, such as the third (rectifying) switching element Q3 2401 and/or the fourth (rectifying) switching element Q4 2402 of FIG. 6, may be turned off.

In this example, turn on of the (rectifying) switching elements Q3 2401 and Q4 2402 occurs after a short delay of the corresponding (power) switching element, e.g. in this example the first (power) switching element Q1 2101 corresponds with the third (rectifying) switching element Q3 2401 and the second (power) switching element Q2 2101 corresponds with the fourth (rectifying) switching element Q4 2401.

As will be understood from the description, when it is determined that the adjusted magnetising current is equal to the primary current, the actual value of the magnetising current is substantially equal to the primary current. This occurs as a result of delays introduced between measurement of the primary current and determination that the adjusted magnetising current is equal to the primary current.

It will be appreciated that, in some examples, the technology described herein may have several benefits. By using a measurement of the primary current to determine when the secondary current is substantially zero, e.g. rather than by using a current measurement on the output side of the transformer, it may be possible to improve the efficiency of the transformer. Further, by also using a maximum value of the primary current in the determination of when the secondary current is zero, it is possible to account for, e.g. processing, delays so as to more accurately determine when the secondary current is substantially zero, e.g. under variable loading conditions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A LLC voltage converter for converting a DC input voltage to a DC output voltage, the LLC voltage converter comprising:

a transformer that includes an input winding and an output winding;

a controller; and a current sensor arranged to measure a primary current through the input winding of the transformer and provide a measurement of the primary current to the controller;

wherein the controller is arranged to:

determine when a secondary current, through the output winding of the transformer, is substantially zero based on the measurement of the primary current and a maximum value of the measurement of the primary current;

determine a magnetizing current through the input winding of the transformer based on the measurement of the primary current;

determine an adjusted magnetizing current based on the magnetizing current and the maximum value of the primary current; and determine when the secondary current is substantially zero based on when the adjusted magnetizing current is equal to the primary current.

2. The LLC voltage converter as claimed in claim 1, wherein the LLC voltage converter comprises a first switching element operable as a synchronous rectifier to provide half-wave rectification of a secondary voltage across the output winding of the transformer.

3. The LLC voltage converter as claimed in claim 2, wherein the LLC voltage converter comprises a second switching element operable as a synchronous rectifier to provide half-wave rectification of a secondary voltage across the output winding of the transformer; and wherein the first switching element and the second switching element in combination are arranged to provide full-wave rectification of the secondary voltage.

4. The LLC voltage converter as claimed in claim 3, wherein the controller is arranged to change the state of the second switching element when the controller determines the secondary current is substantially zero.

5. The LLC voltage converter as claimed in claim 2, wherein the controller is arranged to change the state of the first switching element when the controller determines the secondary current is substantially zero.

6. The LLC voltage converter as claimed in claim 1, wherein the controller is arranged to determine the adjusted magnetizing current by adjusting the magnetizing current proportionally to the maximum value of the primary current.

7. The LLC voltage converter as claimed in claim 1, wherein the LLC voltage converter comprises a voltage sensor arranged to:

measure a primary voltage across the input winding of the transformer; and provide the measurement of the primary voltage to the controller;

wherein the controller is arranged to determine when the secondary current is substantially zero based on the measurement of the primary voltage.

8. The LLC voltage converter as claimed in claim 1, wherein the LLC voltage converter comprises a resonant tank circuit element;

wherein the resonant tank circuit element comprises the input winding of the transformer and a capacitance in series with the input winding of the transformer.

9. The LLC voltage converter as claimed in claim 8, wherein the LLC voltage converter comprises a voltage switching circuit element;

wherein the voltage switching circuit element comprises: an input, across which the DC input voltage is applied;

wherein the voltage switching circuit element is arranged to provide an alternating voltage, which alternates between a high value and a low value, across the resonant tank circuit element.

10. The LLC voltage converter as claimed in claim 1, wherein the transformer is a step-down transformer.

11. The LLC voltage converter as claimed in claim 1, wherein the output winding comprises:

a first portion;

a second portion; and a tap arranged between the first portion and the second portion;

wherein the LLC voltage converter comprises a first switching element operable as a synchronous rectifier to provide half-wave rectification of a secondary voltage across the output winding of the transformer; and wherein the LLC voltage converter comprises a second switching element operable as a synchronous rectifier to provide half-wave rectification of a secondary voltage across the output winding of the transformer; and wherein the first switching element and the second switching element in combination are arranged to provide full-wave rectification of the secondary voltage.

12. The LLC voltage converter as claimed in claim 11, wherein the first switching element is connected to the first portion of the output winding and the output; and/or wherein the second switching element is connected to the second portion of the output winding and the output.

13. The LLC voltage converter as claimed in claim 11, wherein the first portion is the same size as the second portion.

14. A method of operating a LLC voltage converter for converting a DC input voltage to a DC output voltage, wherein the LLC voltage converter comprises:

a transformer;

wherein the transformer comprises:

an input winding; and an output winding;

wherein the method comprises:

measuring the primary current through the input winding to determine a measurement of the primary current;

determining when a secondary current, through the output winding, is substantially zero based on the measurement of the primary current and a maximum value of the measurement primary current;

determining a magnetizing current through the input winding of the transformer based on the measurement of the primary current;

determining an adjusted magnetizing current based on the magnetizing current and the maximum value of the primary current; and determining when the secondary current is substantially zero based on when the adjusted magnetizing current is equal to the primary current.

15. The method of claim 14, wherein the LLC voltage converter comprises a first switching element operable as a synchronous rectifier to provide half-wave rectification of a secondary voltage across the output winding of the transformer.

16. The method of claim 15, wherein the LLC voltage converter comprises a second switching element operable as a synchronous rectifier to provide half-wave rectification of a secondary voltage across the output winding of the transformer; and wherein the first switching element and the second switching element in combination are arranged to provide full-wave rectification of the secondary voltage.

17. The method of claim 16, further comprising changing the state of the second switching element when the controller determines the secondary current is substantially zero.

18. The method of claim 15, further comprising changing the state of the first switching element when the controller determines the secondary current is substantially zero.

19. The method of claim 14, wherein determining the adjusted magnetizing current includes adjusting the magnetizing current proportionally to the maximum value of the primary current.

20. The method of claim 14, wherein the LLC voltage converter comprises a voltage sensor and the method further includes:

measuring with the voltage sensor a primary voltage across the input winding of the transformer;

providing the measurement of the primary voltage to the controller; and determining when the secondary current is substantially zero based on the measurement of the primary voltage.

* * * * *